Dec. 3, 1929.  M. S. ELTON ET AL  1,738,046

AUTOMATIC BRICK MOLDING MACHINE

Filed Jan. 9, 1926  13 Sheets-Sheet 2

WITNESS:
J. A. McDowell

INVENTORS
MURRAY S. ELTON
GEORGE E. BARNHART

Dec. 3, 1929. M. S. ELTON ET AL 1,738,046
AUTOMATIC BRICK MOLDING MACHINE
Filed Jan. 9, 1926 13 Sheets-Sheet 3

INVENTORS
MURRAY S. ELTON
GEORGE E. BARNHART
James R. Townsend
Their Atty

WITNESS:
J. A. McDowell

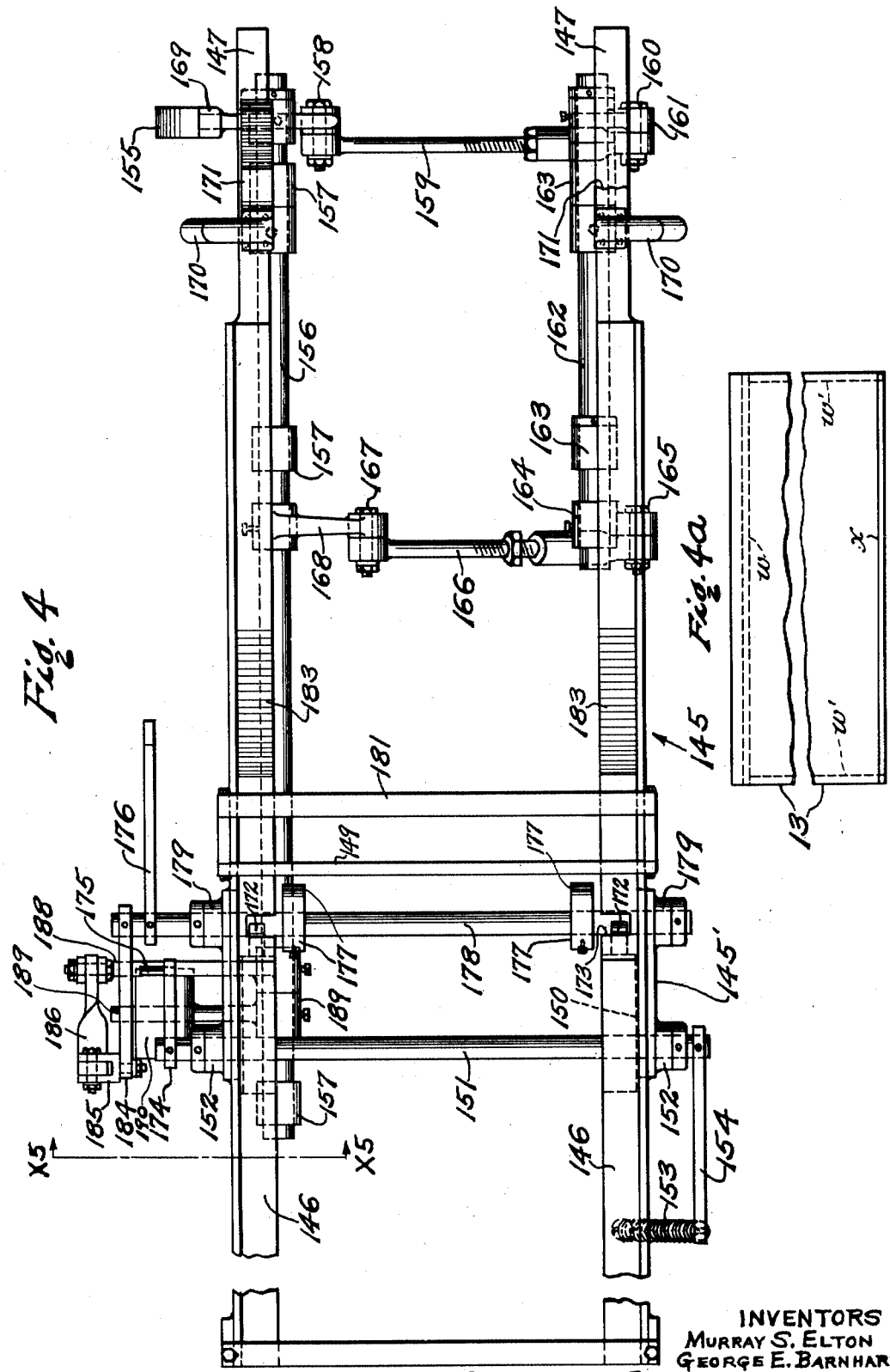

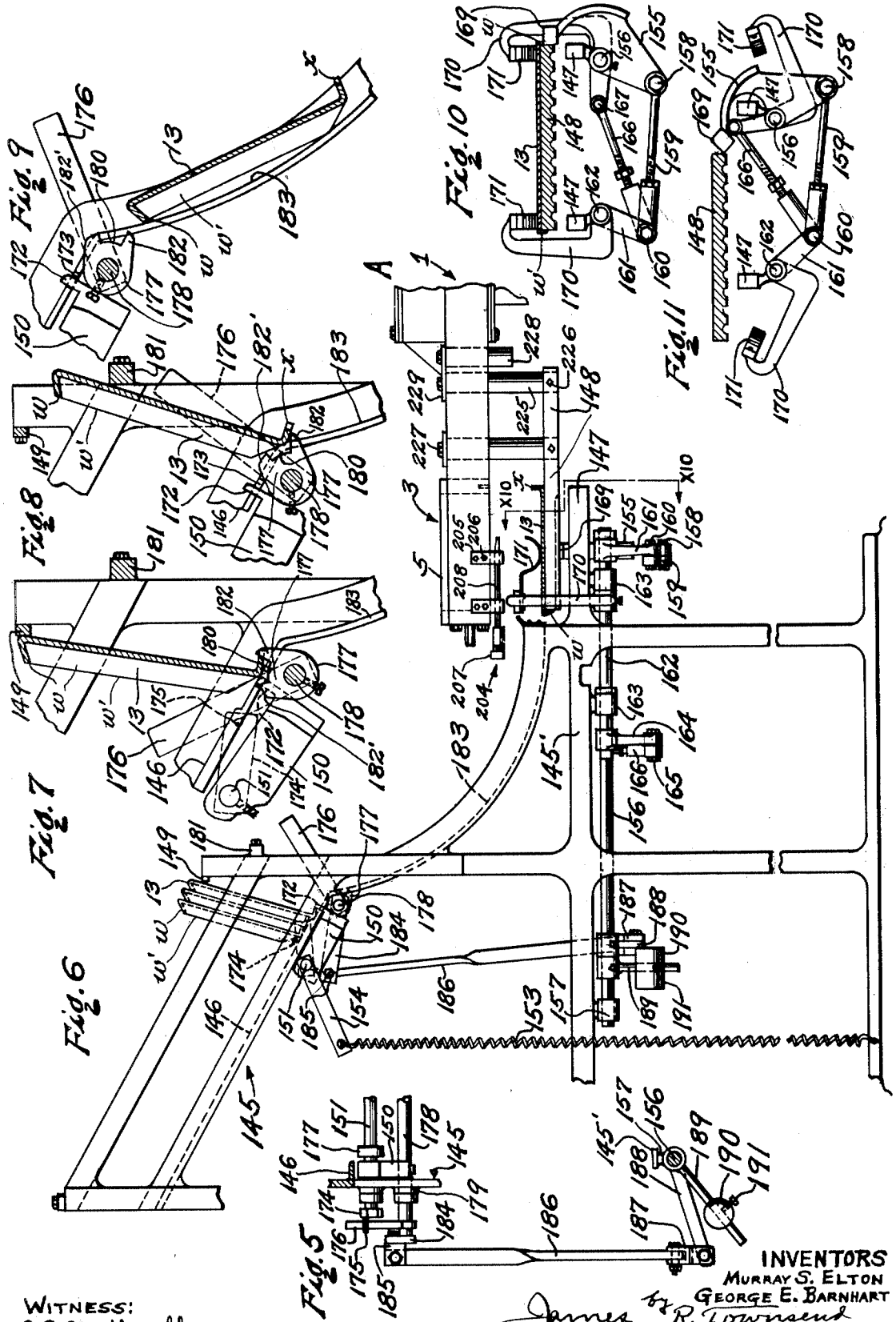

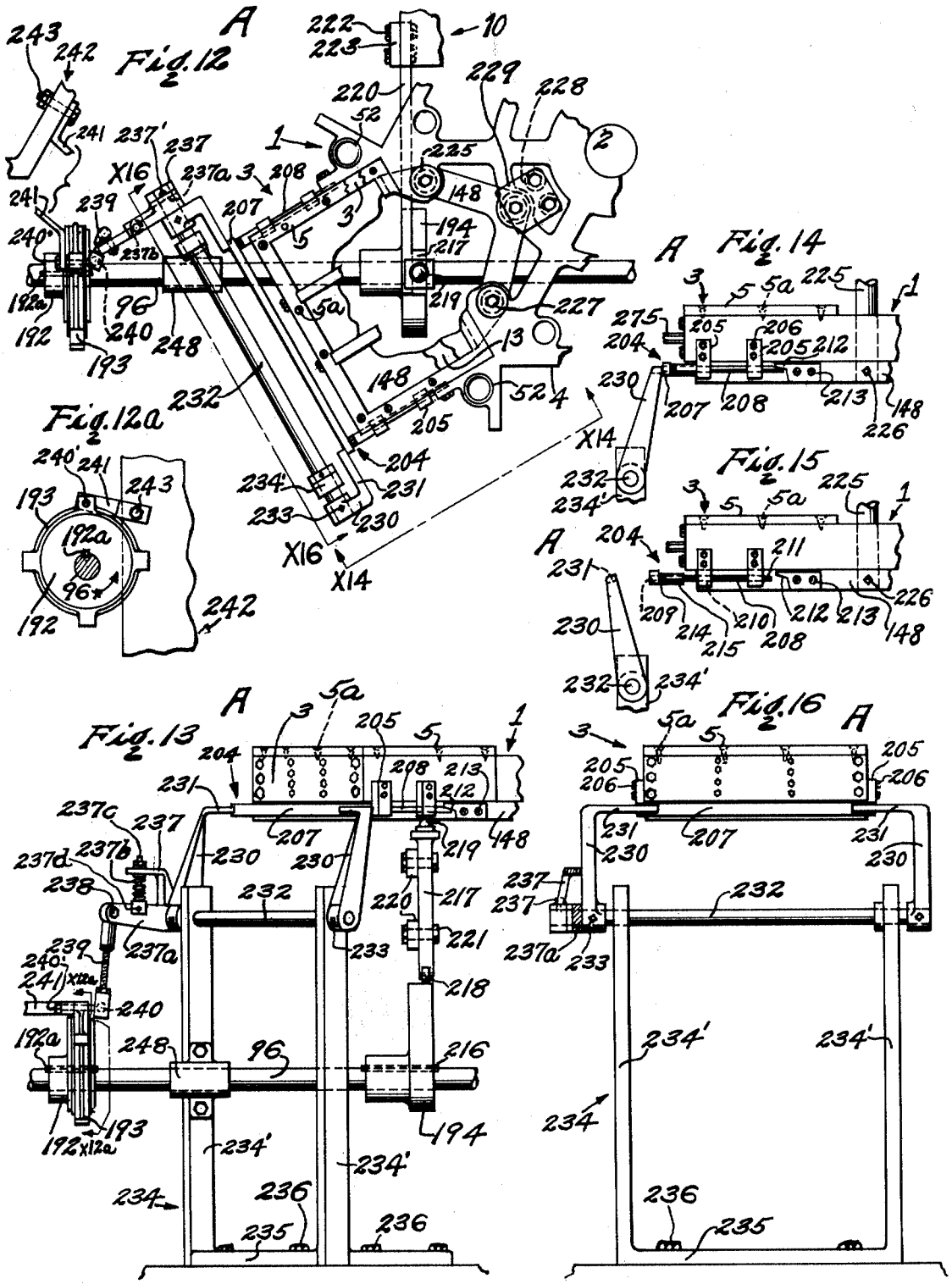

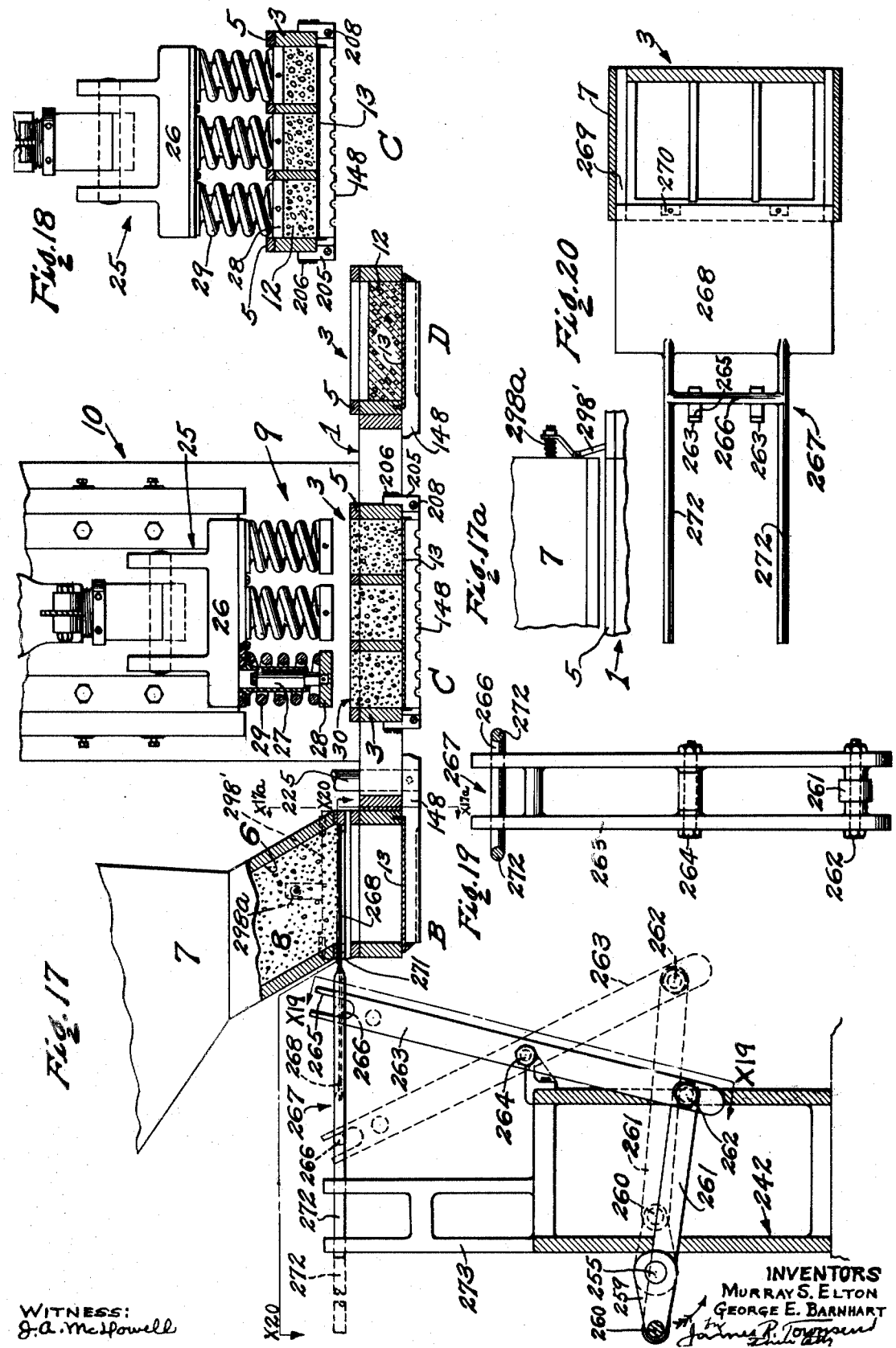

Dec. 3, 1929.  M. S. ELTON ET AL  1,738,046
AUTOMATIC BRICK MOLDING MACHINE
Filed Jan. 9, 1926  13 Sheets-Sheet 8
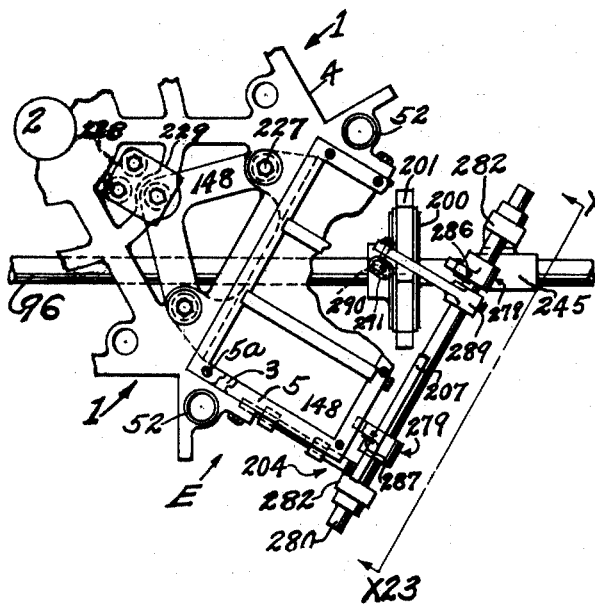
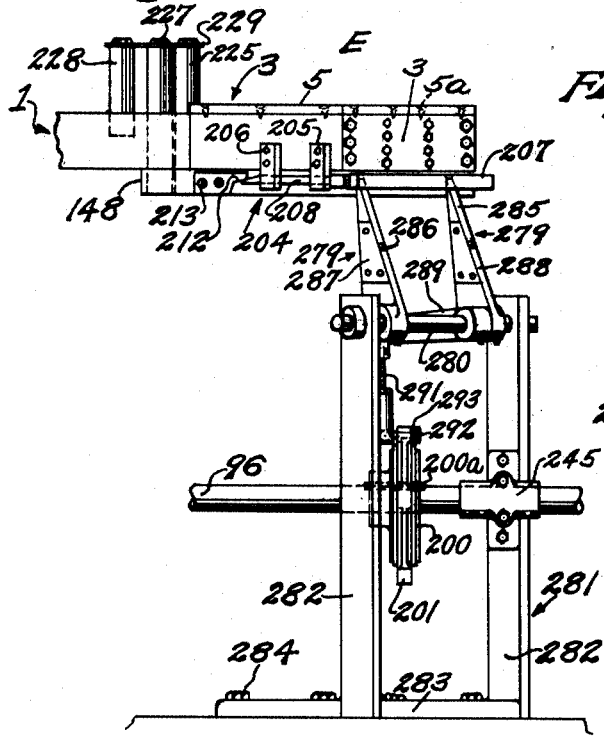
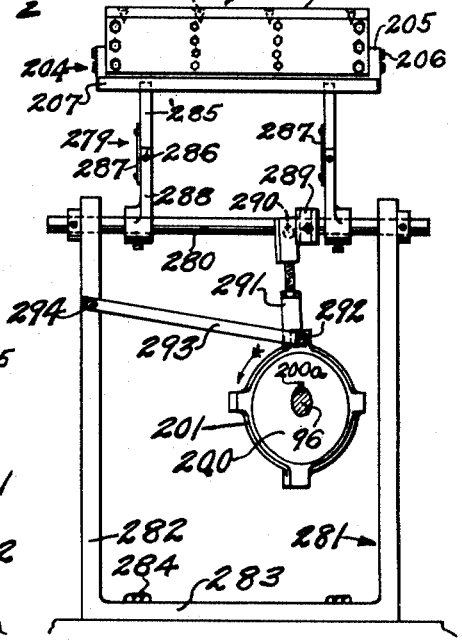
WITNESS:
J. A. McDowell
INVENTORS
MURRAY S. ELTON
GEORGE E. BARNHART
by James R. Townsend
their atty.

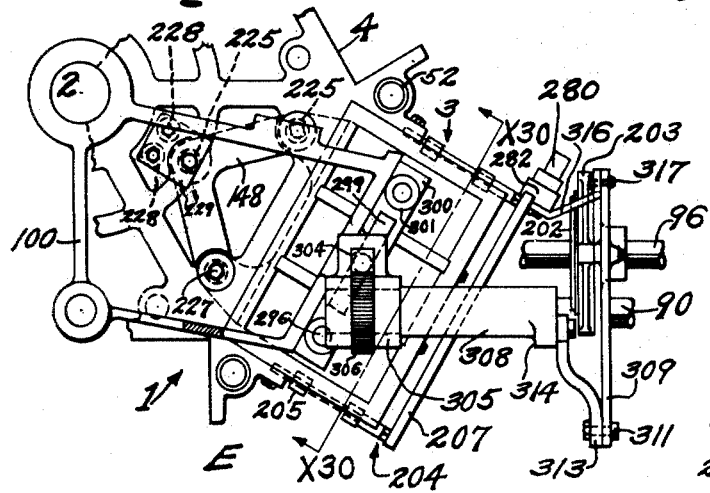
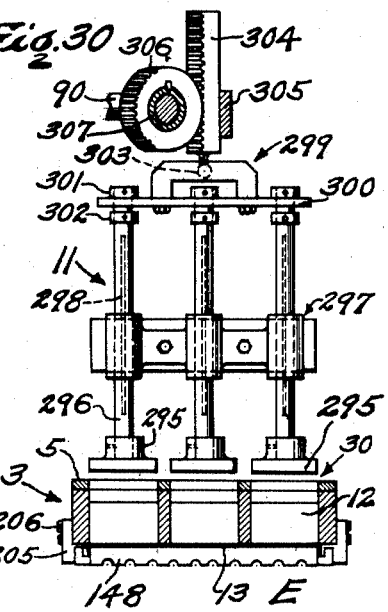
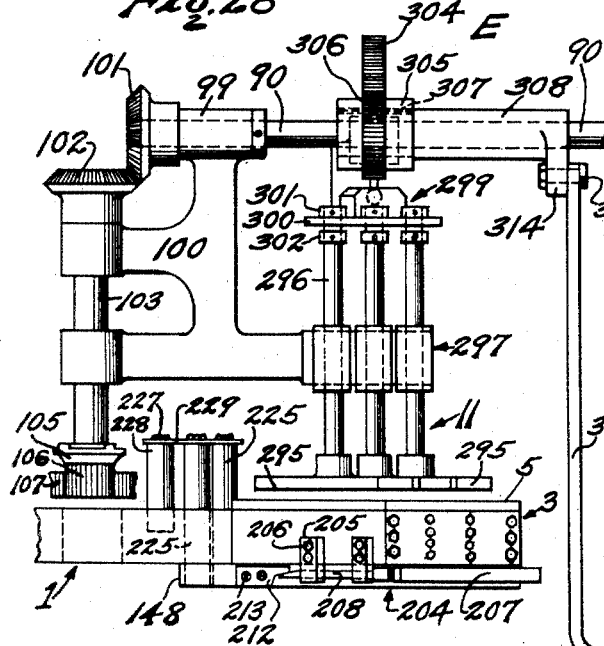
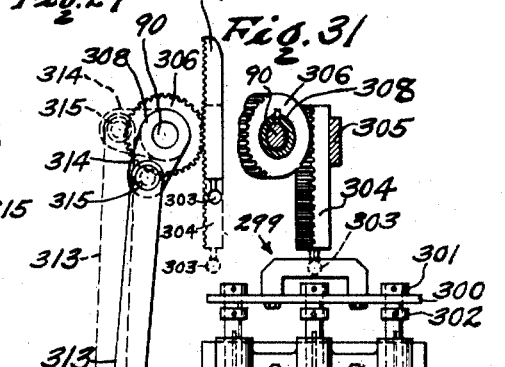
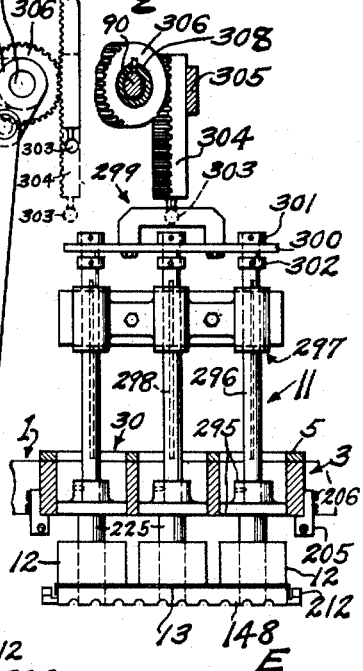

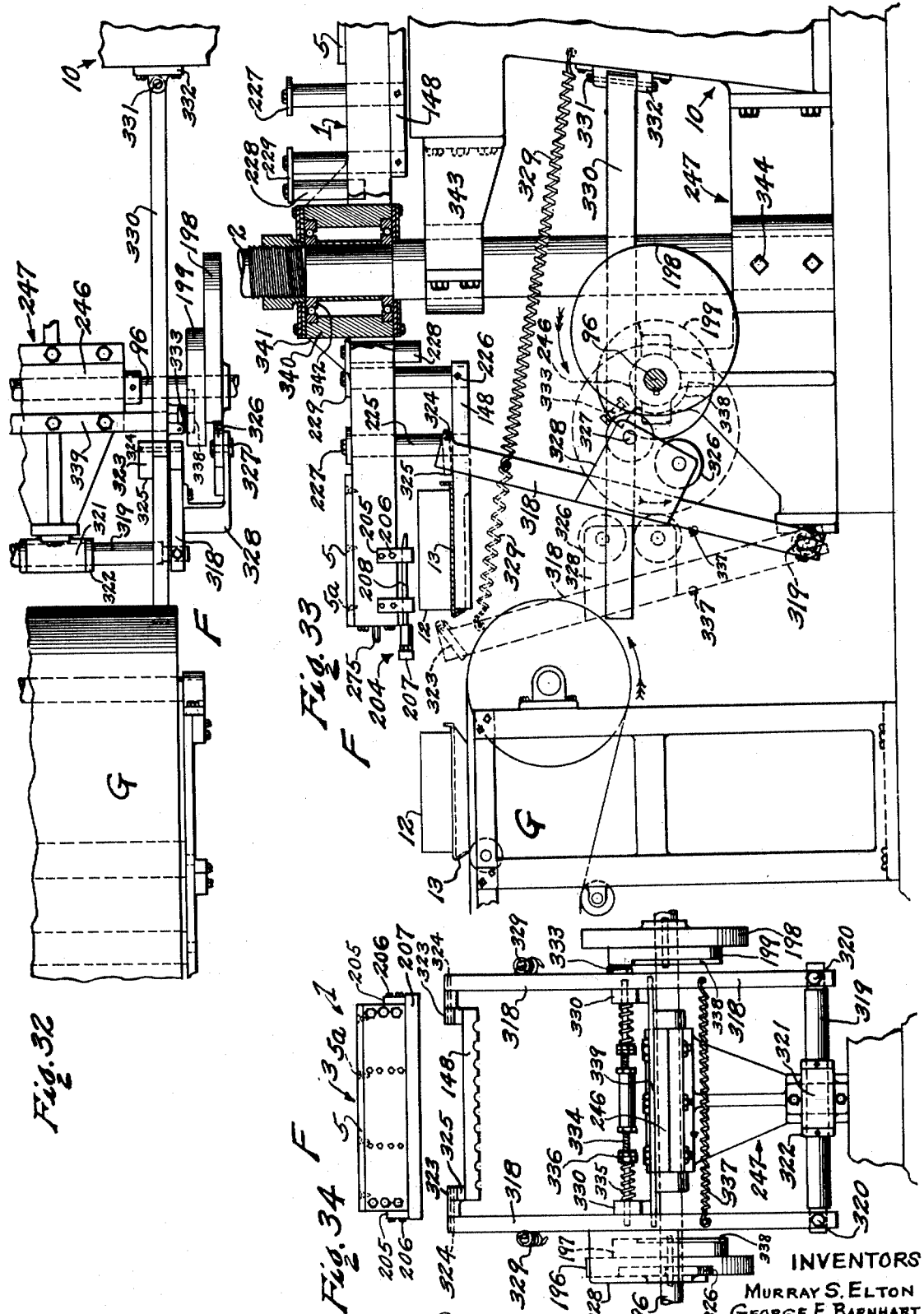

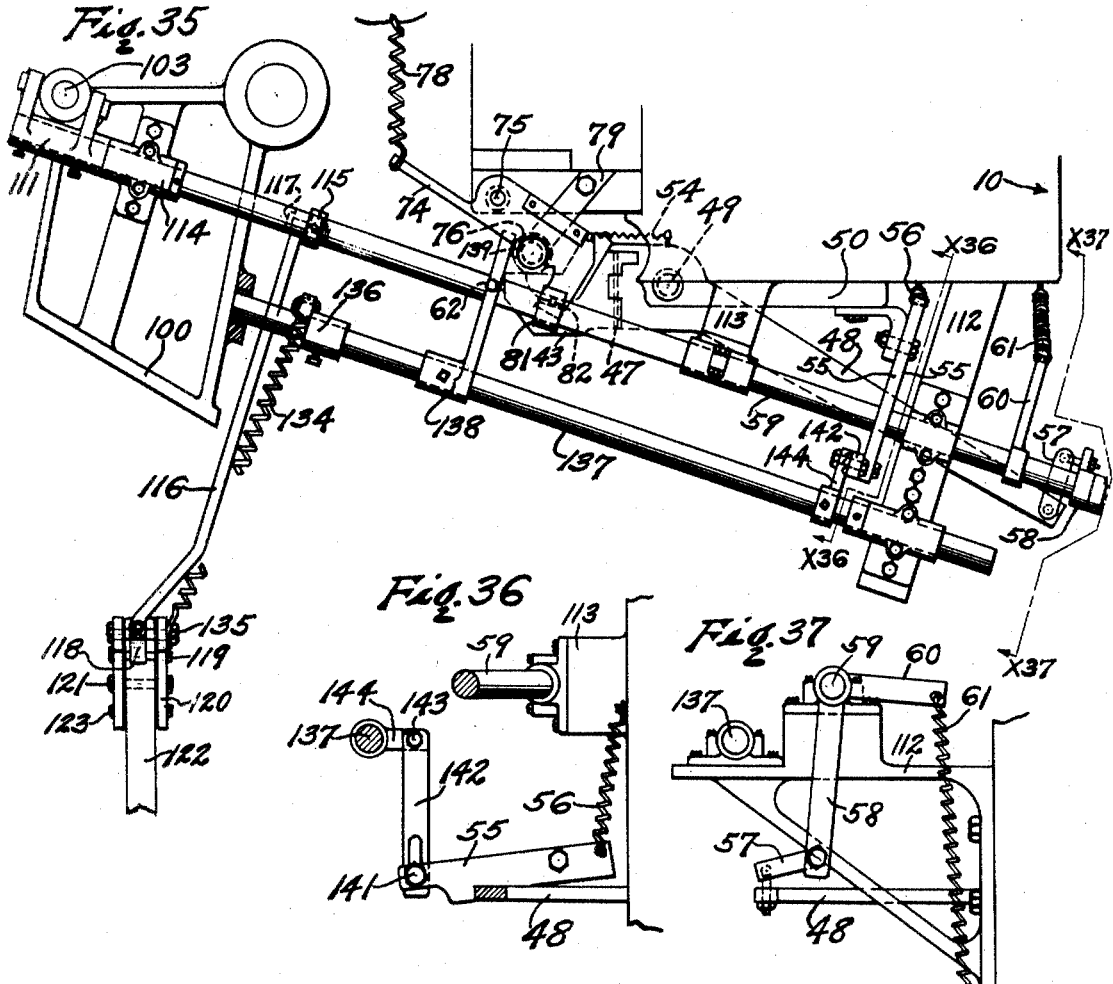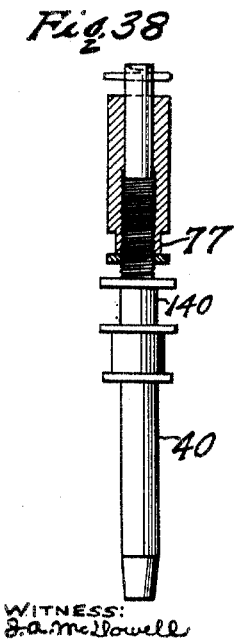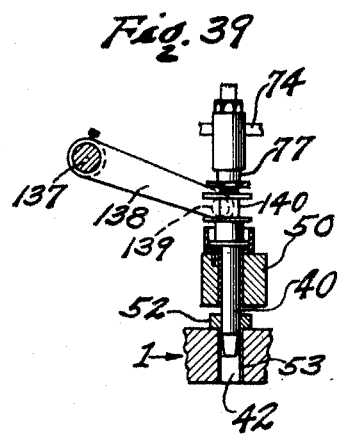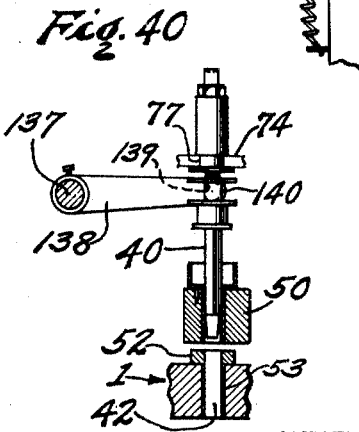

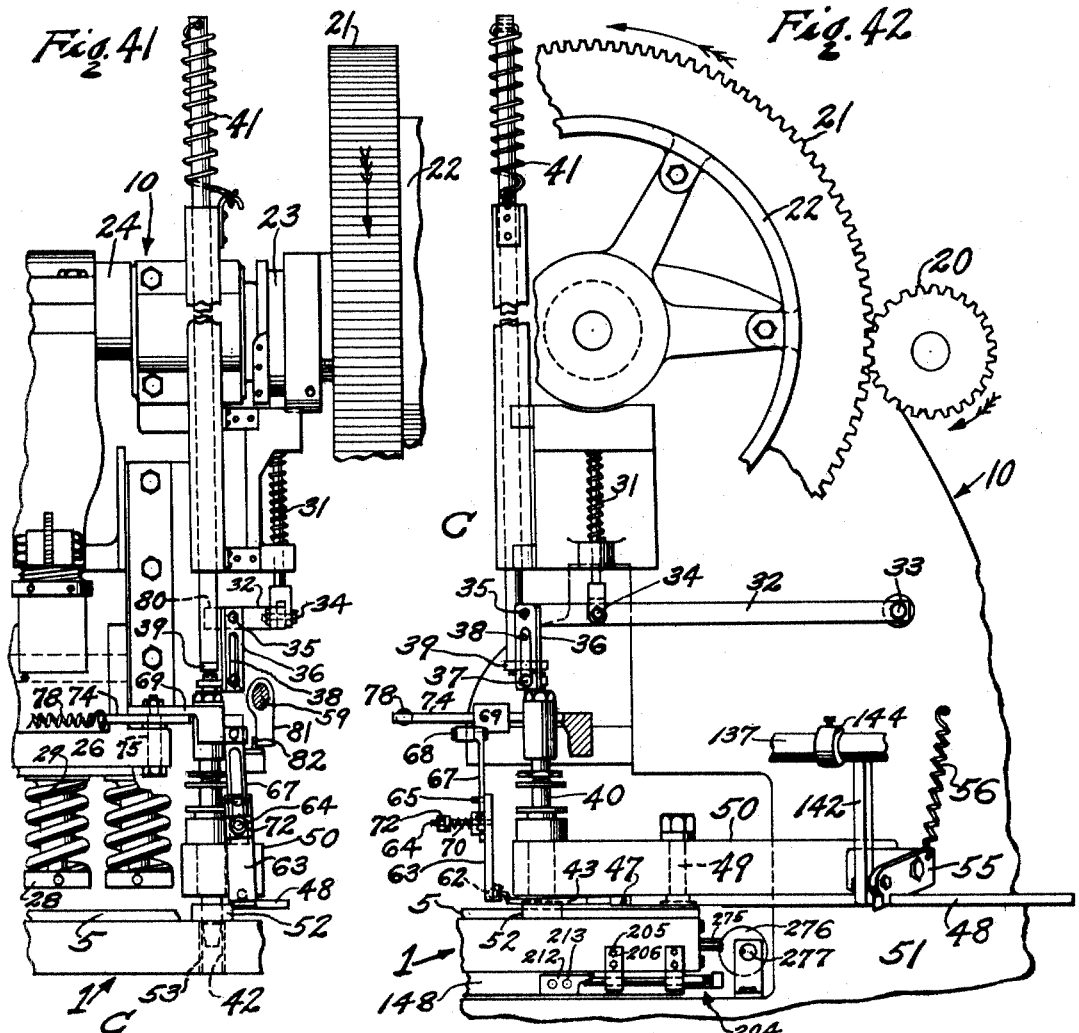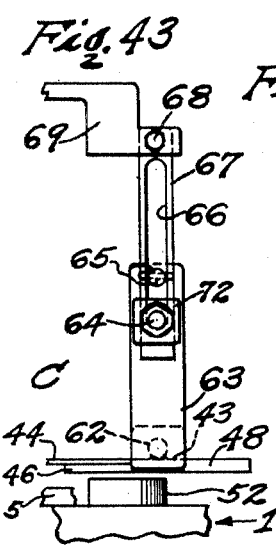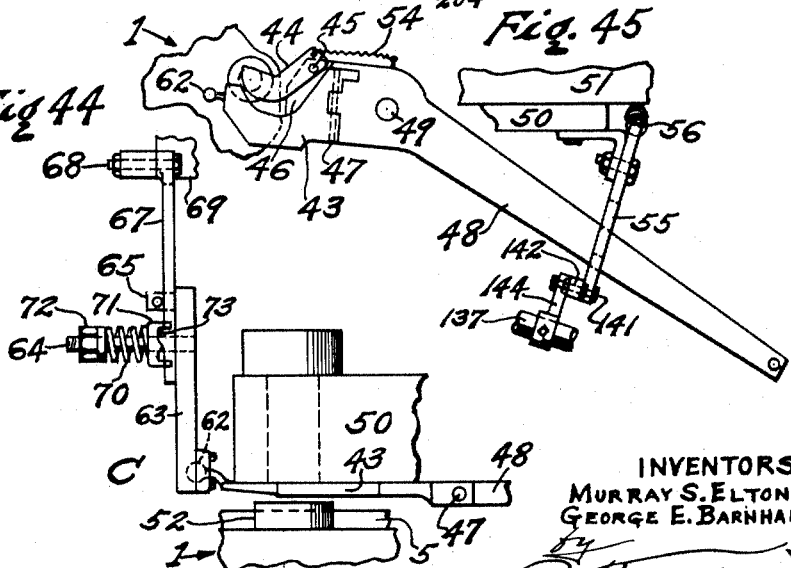

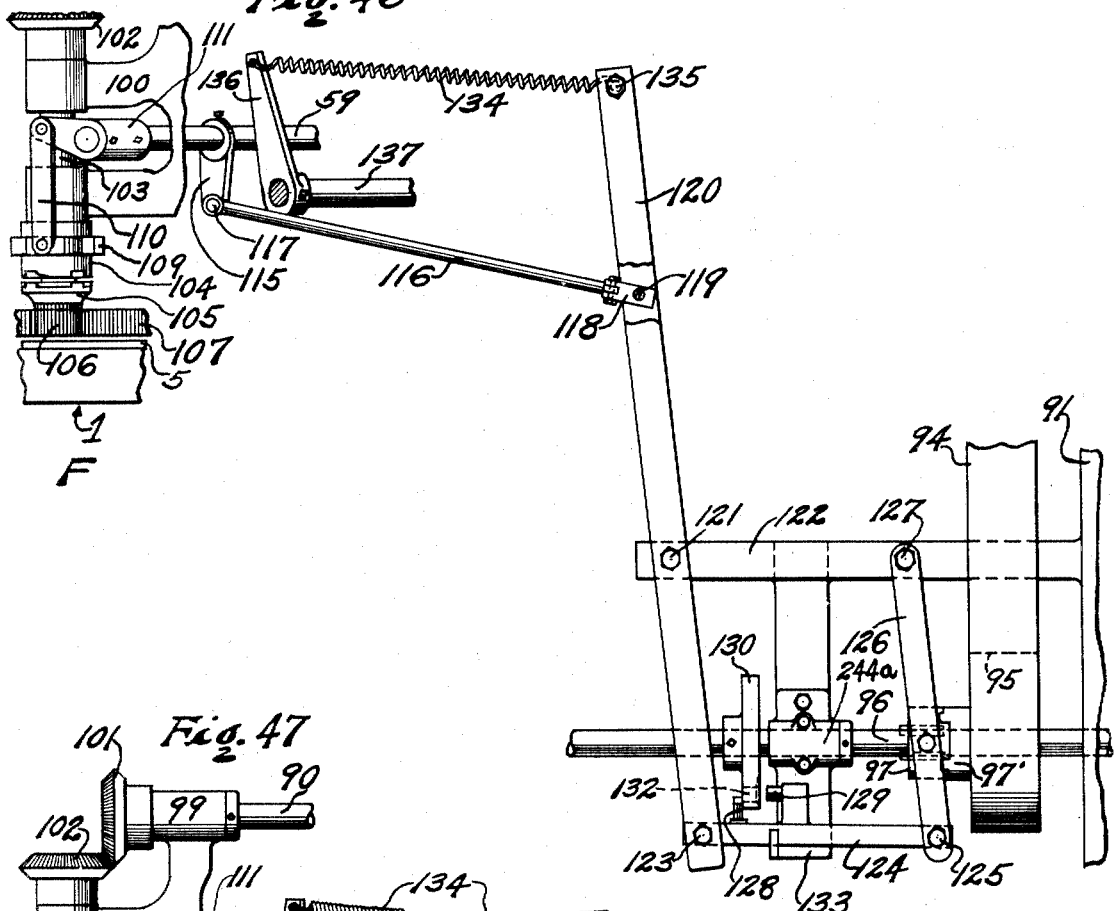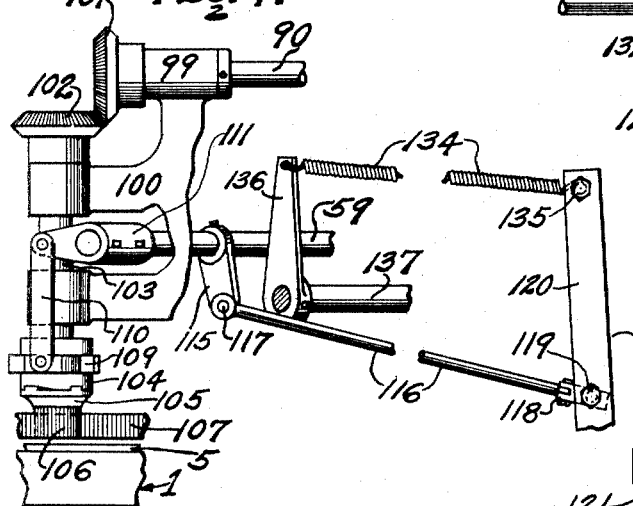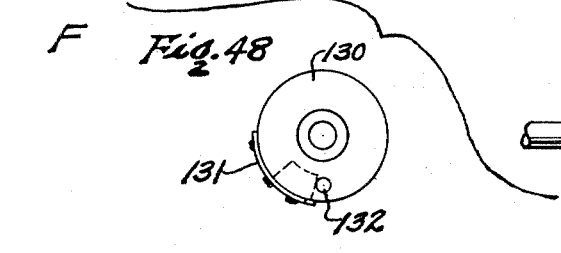

Patented Dec. 3, 1929

1,738,046

UNITED STATES PATENT OFFICE

MURRAY S. ELTON AND GEORGE EDWARD BARNHART, OF PASADENA, CALIFORNIA, ASSIGNORS TO CHARLES R. LITTLE, OF PASADENA, CALIFORNIA

AUTOMATIC BRICK-MOLDING MACHINE

Application filed January 9, 1926. Serial No. 80,323.

This invention is generally applicable to the molding of bricks, tiles and other bodies from a disintegrate mass, and is more especially intended to be used in the manufacture of molded cement bricks, from a moist aggregate of sand and cement.

The aggregate from which the cement bricks are to be molded may be of any suitable composition as for instance the composition of sand and hydraulic cement in a sufficiently moist condition to allow the mass to hold together after the brick is pressed, and yet avoiding such an amount of moisture as would cause the brick to check in drying.

An object of the invention is to provide a machine of the character above indicated, which will take from a hopper the requisite charges of aggregate, place it in a mold in the proper quantity; press the aggregate in the mold to the required density; deliver the pressed brick to a conveyor, and sufficiently dry the bricks while on the conveyor to insure their maintaining their form during the curing process.

In this invention we provide a rotary table adapted to carry a plurality of molds which are adapted and arranged to successively come into position; first, to receive a pallet; second, to be charged; third, to press the charge; fourth, to remove the compressed body of aggregate from the table; and fifth, to deliver the pressed body and its pallet to a conveyor by which the same is carried away for drying and curing.

This invention relates to the manufacture of concrete bricks for various purposes in which different densities of brick may be required and we have discovered that by using aggregates of different moisture content, under different pressures, bricks of different densities can be produced, those of the greater density being produced by great pressure and low moisture content, and those of less density being produced under less pressure with greater moisture content.

In carrying out this invention, we have provided a hexagonal table, and operate the same by six steps for each revolution, and we have made provision whereby the pressed bodies are carried without being operated upon during the step of the table rotation between the pressing and ejecting position for each mold, and an operation is performed with respect to each mold while the table is stationary between the steps throughout five of its steps of progress during each revolution and while each mold simply acts in its turn as a carrier for the molded body during the fourth step after the mold is charged.

An object of the invention is to make an attachment for a stop power press, whereby the automatic molding of bricks can be carried on most economically.

An object is to provide a machine of this character of minimum size for a given output of standard sized bricks within a given time, and we have discovered that by providing a machine having six molds for the five operations, great economy of construction and operation can be effected although each mold is allowed to pass through one step of the machine simply as a conveyor of the molded body; and this construction and arrangement allows a practical machine to be constructed with three compartments to each mold, and as many plungers, so that at one revolution of the press the three rams are made available for simultaneously molding the three bricks with a practically uniform pressure at each revolution of the press.

The invention broadly includes the combination with a rotary mold carrying table having a plurality of molds, of automatic means to rotate the table step by step, a number of steps equal to the number of mold sections; a plurality of mold sections, each provided with a mold and a pallet holder below the mold; and automatic means to insert pallets in the pallet seats of said sections successively; automatic means to supply each mold with a metered charge of aggregate; automatic means to press the contents of each mold; automatic means to expel the molded body with the pallet; an automatically operated conveyor; and automatic means to discharge to such conveyor, a pallet with a molded body thereon; all of these parts being in combination with each other so that the operations are simultaneous with respect to the table and successive with respect to the table sections.

In carrying out this invention we have provided numerous novel parts and combinations of parts as will hereinafter be more specifically described and claimed.

An object of the invention is to minimize waste of aggregate and to make provision whereby any overflow of aggregate will be taken care of without allowing the operation of the machine to be impeded thereby.

Other objects, advantages and features of invention may appear from the accompanying drawings, the subjoined detailed description and the appended claims.

The accompanying drawings illustrate the invention.

Fig. 4 is a plan of the pallet magazine and pallet feed detached.

Fig. 4ª is a fragmental plan of a pallet detached.

Fig. 5 is a fragmental elevation of the pallet magazine and feed on line $x5$, Fig. 4.

Fig. 6 is a side elevation of the pallet magazine and feeding apparatus, and a fragment of the table, and shows the first and fifth positions of the foremost pallet on its way to the pallet seat in the table. The pallet in the fifth position is shown in section to avoid confusion.

Fig. 7 is an enlarged fragmental detail of the pallet feed mechanism showing second position of the pallet.

Fig. 8 is an elevation analogous to Fig. 7, showing a third step of pallet feed.

Fig. 9 is a fragmental detail of the pallet feeding mechanism showing a pallet in the fourth position on its way to the pallet seat in the table.

Fig. 10 is an elevation looking left from line $x10$, Fig. 6, showing the mechanism for seating a pallet on one of the pallet holders of the table and also showing the pallet held in position.

Fig. 11 is a view analogous to Fig. 10, showing the pallet seating mechanism just as the pallet holder swings into position.

Figure 1:
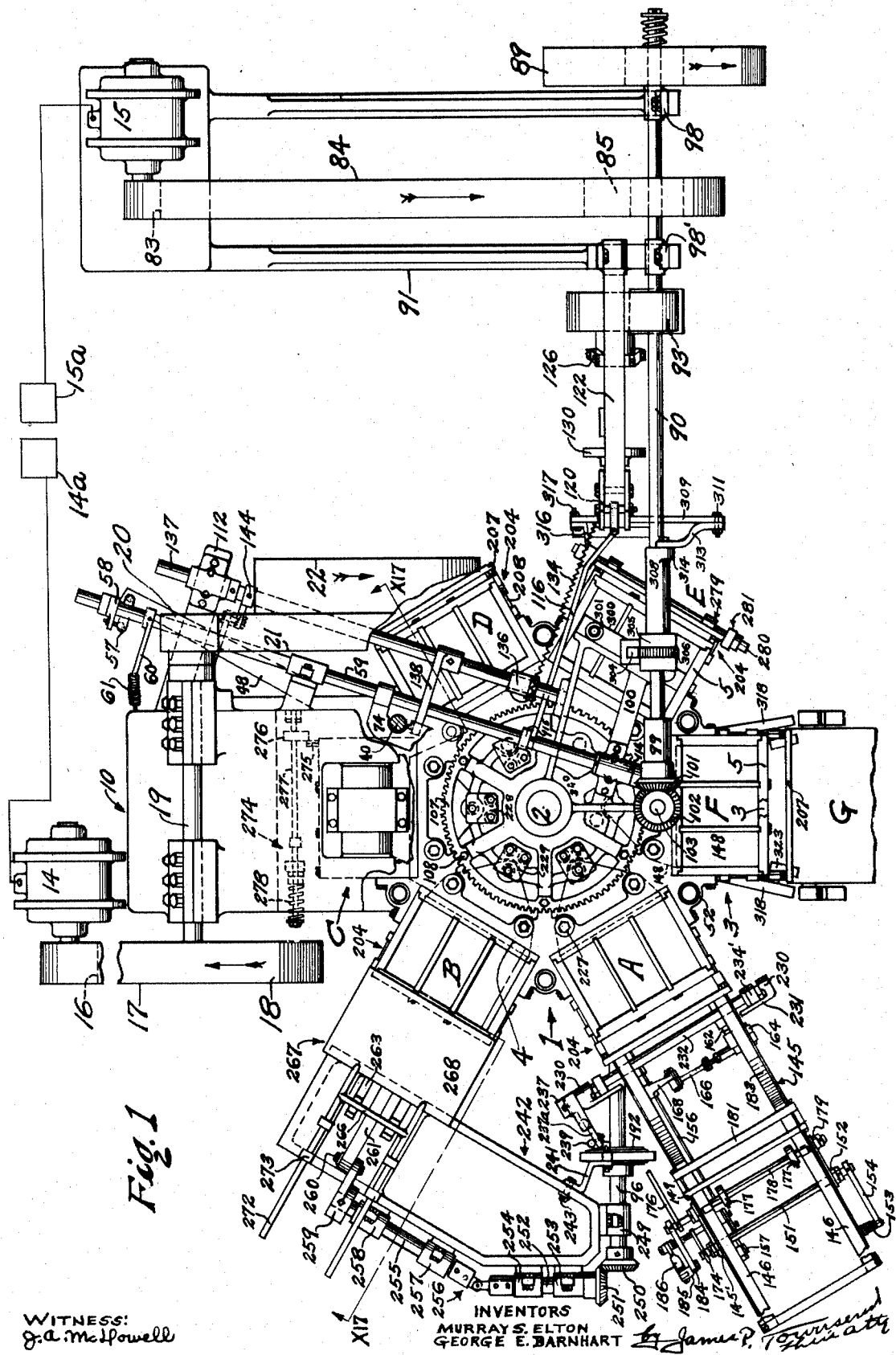
Figure 1 is a fragmental plan view of a machine constructed in accordance with this invention; the hopper being omitted in order to expose parts that would be hidden thereby.
Figure 2:
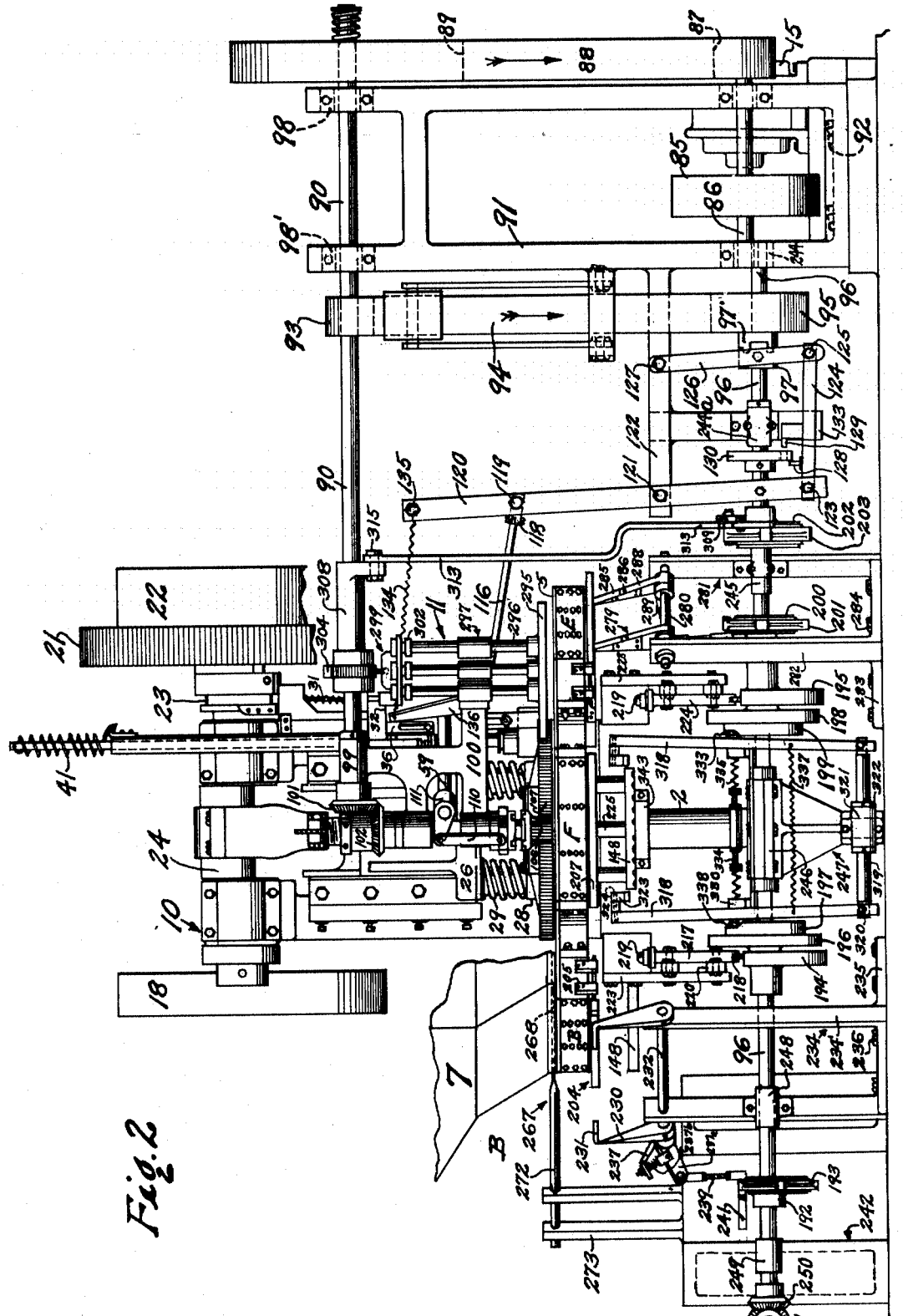
Fig. 2 is a fragmentary front elevation of the machine shown in Fig. 1, showing a fragment of the hopper and gate in closed position, and omitting the pallet magazine; some of the parts being broken away to expose parts that would otherwise be hidden thereby.
Figure 3:
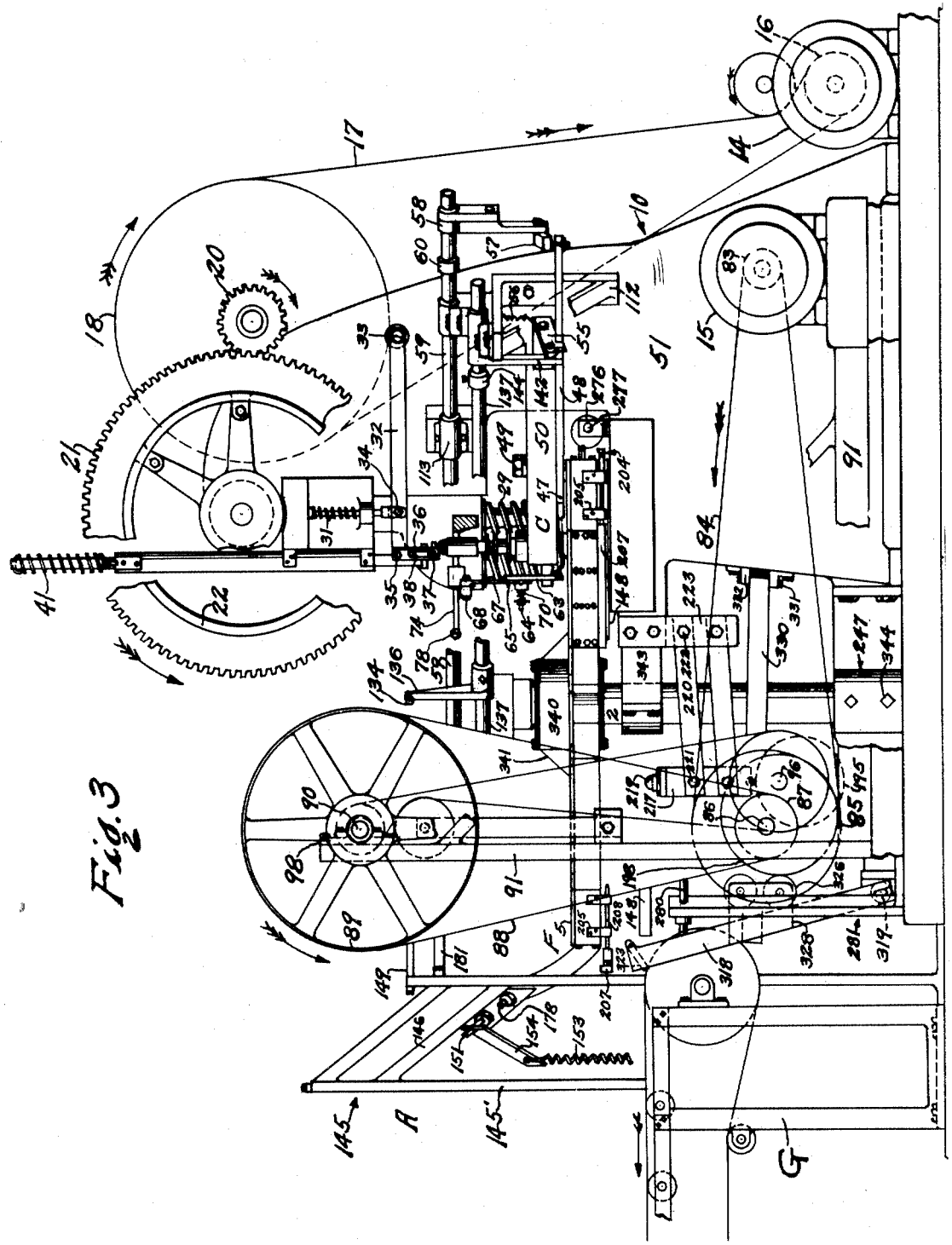
Fig. 3 is an elevation from the right of Fig. 1; portions of the pallet magazine and the conveyor are omitted to avoid confusion of lines; and parts are broken away to expose parts that would otherwise be hidden thereby.

Fig. 12 is an enlarged plan of the pallet locking mechanism shown in Fig. 1, a fragment of the table is shown.

Fig. 12ª is an elevation on line $x12^a$ looking left.

Fig. 13 is an elevation projected from the lower side of Fig. 12.

Fig. 14 is an elevation seen from the plane indicated at $x14$, Fig. 12, looking in the direction of the arrow, and showing the position of the parts at the close of the pallet locking operation.

Fig. 15 is a view analogous to Fig. 14, showing the pallet locking mechanism in unlocked position.

Fig. 16 is an elevation partly in section on line $x16$, Fig. 12.

Fig. 17 is an elevation in section on irregular line $x17,—x17$, Fig. 1.

Fig. 17ª is an elevation viewed from line $x17^a$ in Fig. 17.

Fig. 18 is a fragmental view of a portion of Fig. 17, showing the mold and rams in pressing position.

Fig. 19 is a view partly in section on line $x19$, Fig. 17, looking at the levers for operating the gate for delivery of a charge of aggregate to the mold.

Fig. 20 is a plan view on the plane indicated at $x20$, Fig. 17, showing the parts in the position indicated in broken lines.

Fig. 21 is a fragmental plan view of the mold wheel and the mold at the fifth step showing the pallet unlocking mechanism just before unlocking.

Fig. 22 is a projection from Fig. 21, showing the pallet unlocking mechanism in elevation with the parts in locking position just before the pallet is unlocked.

Fig. 23 is an elevation from the plane indicated at $x23$, Fig. 21, of the mold, the pallet seat, and pallet unlocking mechanism, just before the pallet is unlocked.

Fig. 24 is a fragmental elevation showing the pallet unlocking mechanism with the pallet locked.

Fig. 25 is a view analogous to Fig. 24, showing the pallet unlocking mechanism unlocked.

Fig. 26 is a fragmental elevation showing the mold as it strikes the unlocking mechanism, part of which is shown.

Fig. 27 is a fragmental plan showing a portion of the table with molds in the fifth position with the pallet locking mechanism locked and also showing the brick expelling mechanism.

Fig. 28 is an elevation of the brick expelling mechanism shown in Fig. 27.

Fig. 29 is an elevation from the right of the mechanism shown in Fig. 28.

Fig. 30 is an elevation in section on line $x30$, Fig. 27, showing position before expelling the bricks.

Fig. 31 is a view analogous to Fig. 30, showing the parts in position after the bricks have been expelled.

Fig. 32 is a fragmental plan of the pallet and brick discharging mechanism, some of the parts being omitted to avoid confusion of lines.

Fig. 33 is a fragmental elevation of the pallet and brick discharging mechanism, showing in broken lines the position after removing the pallet and bricks to the conveyor; and in solid lines, the position just before pushing the bricks out onto the conveyor, a fragment of which is shown.

Fig. 34 is a fragmental side elevation showing the pallet and brick discharging mechanism and a portion of the table and other mechanisms.

Fig. 35 is a plan view of the mechanism to hold the table and the molds in exact position for the various operations at each of the six steps in each revolution of the table.

Fig. 36 is a fragmental elevation in section on line $x36$, Fig. 35, showing the latch for holding the registering pin hole closing mechanism in closing position.

Fig. 37 is a fragmental elevation from line $x37$, Fig. 35.

Fig. 38 is an enlarged detail partly in section illustrating the register pin for holding the table and the molds in exact position for the various operations at the several steps.

Fig. 39 is a view on smaller scale than Fig. 38, showing the register pin in locked position.

Fig. 40 is a view analogous to Fig. 39, showing the unlocked position of the register pin.

Fig. 41 is a fragmental front elevation illustrating the mechanism for holding the table and molds in exact positions for the respective steps.

Fig. 42 is a side elevation further illustrating the mechanism shown in Fig. 41.

Fig. 43 is a front elevation of the socket closing mechanism.

Fig. 44 is a side elevation of what is shown in Fig. 43.

Fig. 45 is a plan of the device for closing the socket for the register pin.

Fig. 46 is a fragmental front elevation of a portion of the mechanism for holding the table and the molds in exact position.

Fig. 47 is a view analogous to Fig. 46, showing the clutch in a position; the reverse to that shown in Fig. 46.

Fig. 48 is a detail of the registering disc.

1 indicates a rotary table mounted to revolve on an upright axis 2; and 3 indicates mold bodies fixed to and projecting radially from the table. Said table is shown hexagonal; a mold projects from each of the six sides 4 of said table, and the top of said molds are shown flush with the top of the table.

Each mold is provided with a detachable wear frame 5 that is fixed by machine screws 5ª to the mold body and extends above the top of the table so that the depth of the mold including the body 3 and frame 5 with its frame is equal to the depth of the loose charge with which each mold is supplied from the chute 6 of a hopper 7 extending above the table to supply the molds with aggregate 8 by gravity.

Each mold is provided with partitions 3ª so that a plurality of bricks are formed at each operation of said ram.

9 indicates a pressing ram operable by a power press 10 of any suitable well known construction, which is adapted to compress the aggregate to the required density in the mold.

11 indicates expelling rams that expel from the mold the molded bodies, as the bricks 12, and the pallets 13, which carry the aggregate and the molded bodies from the time the aggregate is introduced until the molded bodies are sufficiently set to be removed from the pallets, which are then returned to a magazine 146 and are again used in the machine.

The press 10 runs continuously, being driven by an independent motor 14, and the table is revolved intermittently step by step by an independent continuously running motor 15; and preferably there are six steps to each revolution of the table; said table being hexagonal as shown and having each lateral face of the table fitted with a mold.

The two independently operated motors are shown as electric motors controlled by switches 14ª and 15ª, respectively, which are stationed at any convenient place.

The press operating motor 14 is connected through its pulley 16, the belt 17, pulley 18, shaft 19, pinion 20, and bull-gear 21 having fly wheel 22; and these parts are run continuously with said motor 14 and are adapted by clutch 23 to be connected with, and to revolve the crank shaft 24 that operates the ram 25 having the cross-head 26 provided with spring extended adjustable plunger rods 27 holding the plungers 28 normally extended downwardly by stiff springs 29 and adapted to be thrust down into the compartments 30, respectively, of the molds 3.

The clutch 23 is operable by the trip-rod 31, which is tripped by the trip-lever 32, fulcrumed at 33 to the press frame and pivoted at 34 to the trip-rod and at 35 to the slotted link 36 that is connected by means of a pin 37 in the slot 38, and a slide 39, with the table locking register pin 40, which is adapted to be forced down by gravity and by spring 41, into the table locking sockets 42 formed in bushing 52 that has a press fit in hole 53 formed in the table to lock the table in exact register with the various mechanisms that operate with the table to supply, press, expel, and discharge the pallets and material, as manufacture of the concrete bricks proceeds.

43 is a trigger to operate the register pin 40.

44 is a guard pivoted at 45 to a support 46 that is carried on the trigger 43 which is hinged by a horizontal axis 47 to a lever 48 that is pivoted on the vertical axis 49 to an extension 50 of the press-frame 51 and is adapted to swing slightly on the vertical axis 49 to come into and out of position to intercept the locking pin 40 except when moved out of position by a shoulder formed by the top of the bushing 52 for the socket 53 formed in the table to receive bushing 52, to engage the register or locking pin 40. The guard 44 is normally held in pin intercepting and socket 42 closing position by a spring 54; and in this position the sockets 42 will be closed by the guard 44. The lever 48 is held in a non-intercepting position by a latch 55 which is yieldingly held in latching position by spring 56.

The lever 48 is connected by a link 57 to the rock arm 58 on the rock shaft 59, and is connected through a rock arm 60 to a spring 61 that helps to swing the lever 48 into pin intercepting position.

The support 46 has a ball and socket connection at 62 to a link 63 that is connected by means of link joint pins 64 and 65 in the slot 66 of the slotted link 67 that fulcrums at 68 to an extension 69 of the cross-head 26 to regulate the operation of pin 40 that locks the table and press together during operation of the pressure means.

The pin 64 has a spring 70 and clip 71 that are adjustable by a nut 72; the clip 71 being adapted to slide over the boss 73 of the slotted link 67 when the ram 25 is raised or lowered. This provides a lost motion movement to take care of the excess travel of the ram 25 and operates the trigger 43 to permit operation of the lever 48.

74 indicates a lever that is pivoted at 75 to the cross-head 26, and that is provided with a semi-circular groove 76 that fits part way around the groove 77 of the locking register pin 40, when the ram 25 is lowered, and the lever 74 raises the locking pin 40 on the upstroke of the ram.

The lever 74 is normally held against the locking pin 40 by a spring 78 and a guide 79 that helps to support the lever and keeps it in alignment.

When the locking pin 40 is raised out of the table locking sockets 42 by the upstroke of the ram 25, slide 39 strikes a lug 80 on the trip-lever 32, thus raising the trip-rod 31, which operates the clutch 23.

To release the lever 74 from the locking pin 40, a lever 81 on the shaft 59 strikes a pin 82, that releases the lever 74 and holds it in one position while the locking pin 40 is forced into the table locking socket 52.

The main operating motor 15 is connected through its pulley 83, belt 84, pulley 85, jack shaft 86, pulley 87, belt 88, and pulley 89, on the table driving shaft 90; these being supported by a frame 91 that is bolted to the foundations by the bolts 92.

The pulleys 83, 85, 87 and 89 are simply speed reducing pulleys to transmit power from the high speed motor 15 to the main driving shaft 96 that may have a speed of about thirty revolutions per minute.

The table driving shaft 90 is connected to the main driving shaft through pulley 93, belt 94, loose pulley 95 journalled on the main driving shaft 96, and adapted to be intermittently connected thereto by a clutch 97, 97'. Said main shaft operates the various mechanisms that cooperate to effect the manufacture of the concrete bricks.

The table driving shaft 90 is supported by the high speed motor frame 91, and is journalled at one end in the bearing 98, 98', and at its other end in the bearing 99 of the bracket 100. A bevel gear 101 on the main shaft 90 meshes with a bevel gear 102 on a vertical shaft 103 that is journalled in the bracket 100, and has a vertically sliding clutch 104 that engages a clutch 105 which is provided with a peripheral gear 106, that meshes with a gear wheel 107 which is fixed to the table by the bolts 108, thus to revolve the table intermittently step by step according to the connections and disconnections made by clutch 104.

The clutch 104 is provided with a collar 109 having connecting links 110 that are fulcrumed to a rock arm 111 that is fixed to the rock shaft 59.

The rock shaft 59 is supported at one end by brackets 112 and 113 that extend from the main press 10 and is supported at its other end, by the bearing 114 of the bracket 100.

115 is a rock arm that is fixed to the rock shaft 59 and is connected to a connecting rod 116 by a pin 117, and a connection 118, that is pivoted at 119 to a lever 120 which is fulcrumed at 121 to an extension 122 of the frame 91.

The lever 120 is connected through a pivot 123, shifting bar 124, and pivot 125 to a clutch lever 126 that is fulcrumed at 127 to the extension 122.

The shifting bar 124 is provided with a vertical roller 128 and a registering pin 129 so spaced apart that a registering disc 130 fixed to the driving shaft 96 may revolve between them, allowing the vertical roller 128 to roll on one side of the disc and against a cam-like projection 131 that is fixed on the face of the registering disc 130, and shifts the bar 124 so that the registering pin 129 slips into the hole 132 of the registering disc when the lever 120 fulcrumed at 121 has been thrown by rock arm 115.

A guide 133 keeps the shifting bar 124 from being thrown out of alinement, and thus insures that the registering pin will be in proper position at the end of each revolution of the disc.

At the upper end of lever 120 a spring 134 is fastened at 135 and is connected to a rock arm 136 on a rock shaft 137 that is supported by the brackets 100 and 112, respectively and such spring 134 is extended under tension during operation of the press through the medium of 138 which indicates a rock arm that is fixed to the rock shaft 137, and connects through a roller 139 to the locking pin 40 as at 140, so that when the ram 25 raises the locking pin 40 it causes the shaft 137 to rock and thereby release the latch 55 that intercepts the lever 48. The rocking of shaft 137 through this mechanism when the locking pin is lowered, applies tension to spring 134 which will operate lever 120 to move the clutch members 97, 97′ into engagement with each other.

The latch 55 is connected to the rock shaft 137 through a pivot 141, link 142, pivot 143 and a crank 144, that is fixed to the rock shaft 137, as best illustrated in Figs. 35 to 48.

At the time clutches 97′ and 97 are engaged, the clutches 104 and 105 are disengaged and the table is locked by pin 40, while other mechanisms are allowed to operate and to perform their work.

When the clutches are reversed, the table revolves one-sixth of a turn and the other mechanisms stand at rest.

The pallets are in the form of plates of metal or other suitable material having downwardly extending holder engaging means in the form of a flange $w'$ projecting down at the rear and lateral edges of the plate from one face thereof; and a mold engaging detent $x$ projecting up at the front edge of the plate to hold the pallet from slipping outwardly when the same is clamped between the mold and the pallet holder. Said detent is shown as a flange.

A pallet magazine 145 supported by a frame 145′ is provided to supply the pallets 13, one at a time, to the machine; and said pallet magazine is arranged radial to the table at station A as shown in Fig. 1.

Referring to Figs. 4–11, the magazine 145 is constructed with a forwardly and downwardly slanting slideway formed by two rails 146, and an extension 147 below the level of the mold and its attendant pallet holder 148 where they come to rest at station A each time the table is stopped.

As shown in Fig. 6, the magazine is adapted to support the pallets on the edge having the detent $x$ with said detent projecting forwardly, and the holder flange $w$ $w'$ projecting rearwardly; and a vertical reciprocating stop 172 is arranged to prevent the lower edge of the pallet from sliding down the guideway railes 146, and an upper retainer 149 is arranged to support the upper edge of the advance pallet when the pallets are in the magazine as shown in Fig. 6, with the pallets slightly aslant forwardly.

A tappet 169 and rockers 155 and 177 are so connected and arranged that only one pallet is released at each stop of the table.

The lower edge of the front pallet in the magazine is normally held back by detents 172 of latches 150 that are fixed to the rock shaft 151 which is supported by bars 152 of the magazine 145 and at each operation of tappet 169, the detents 172 of said latches are withdrawn to allow a pallet to pass, and returned to hold the second and successive pallets in the magazine while the advance pallet 13 is being delivered to the chute by the rockers 177 operated by action of the pallet holder 148 on the tappet 169.

Said latches 150 are yieldingly held by a spring 153 operated through a rock arm 154 that is fixed to the rock shaft 151 on the right hand side of the magazine to hold the latches normally with detents 172 in position to retain the second and succeeding pallets.

A notched rocker 177 is provided to receive the lower end of the pallet when the same is released by withdrawal of the stop 172, and to lower the pallet so it will pass the upper retainer 149 and allow the upper portion of the pallet to lean forwardly against a stop 181 that is stationed below the level of and in front of the retainer 149, and the rocker is so arranged that when it is rocked forward from the position shown in Fig. 8, the end of the pallet provided with the detent $x$ is delivered to the chute 183, which is at such a steep angle that the pallet slides down the chute to position with the holder engaging wall in practical engagement with the sides and rear of the pallet holder and with the detent $x$ projecting up in position beyond a vertical, not shown, drawn down from the inner end of the mold, so that the detent $x$ will engage the inner edge of the mold when the holder is raised to bring the pallets against the bottom of the mold.

In order to insure proper seating of the pallet on the pallet holder, pallet seating springs 171 are provided and are operated by each pallet holder 148 as it approaches pallet receiving position at station A.

155 is a rocker operable by a tappet 169 which the pallet holder 148 moves in the direction of table rotation as the table revolves to bring such holder into position to receive a pallet from the chute 183 that leads from the magazine 145 to the pallet holder. When a pallet is released at the top of the chute, it will slide down the chute with such velocity that it will be delivered onto the top of the pallet holder and will be brought to rest by the rear flange $w$ engaging the outer edge of the pallet holder.

The rocker 155 is fixed to a horizontal rock shaft 156 that extends to a position below the lower end of the chute 145 and is connected by rock arm 188, link 187 and connecting rod 186 with the mechanism that releases the pallet from the pallet magazine.

Said springs 171 are adapted and arranged to stand above the pallet holder 148 at the moment the pallet is delivered above the pallet holder from the chute 183.

This position is shown in Fig. 10 and the pallet seating members must be brought out of such position as soon as the pallet is seated as shown in Fig. 10, and returned to the position shown in Fig. 11, so that the pallet holder with the pallet thereon, not shown in Fig. 11, can be raised to bring the pallet against the bottom of the mold in the position which will be understood by reference to Figs. 17 and 18.

The pallet holder 148 approaches the end of the chute 183 while lowered from the mold and while its upper surface is at such a level as to receive the pallet as it shoots out from the end of the chute 183; and the tappet 169 for operating the pallet seating springs 171, is at such level with respect to the pallet holder as it moves in the direction indicated by the arrow in Fig. 11, that, as the table revolves, the pallet holder 148 moves the tappet 169 in the direction indicated by the curved arrow in Fig. 11, thus bringing the pallet seating members 170 into position with their springs 171 above the pallet 13 on the pallet holder as indicated in Fig. 10.

A counter weight 190, shown in Figs. 5 and 6, tends to hold the tappet 169 in position to be operated by the pallet holder when in its lower position, and said weight also tends to hold the pallet seating members 170 with their springs 171 in depressed position out of the way of the pallet and the pallet holder as shown in Fig. 11; and the pallet holder 148 must be raised from the position shown in Figs. 6 and 10 to the position shown in Figs. 17 and 18 to hold the pallet against the bottom of the mold 3.

When the counterweight withdraws the springs 171 as indicated in Fig. 11, the pallet holder may raise the pallet to close the bottom of the mold.

The rock shaft 156 is connected by a rock arm 188 and connections, with the rock shaft 178 having the pallet delivering rocker 177 fixed thereto; and the parts are so arranged that when the arms 170 have been withdrawn, the descent of the weight 190 is stopped by the connections between the rock arm 188 and the shaft 178.

The tappet 169 is connected through a fulcrum 158, adjustable rod 159, fulcrum 160, the rock arm 161, that is fixed to a rock shaft 162 which is of less length than shaft 156 and which is located directly opposite to shaft 156 and is supported by, the bearings 163. 164 is an arm fixed to the shaft 162 and connected through a fulcrum 165, adjustable rod 166 and fulcrum, 167 to arm 168 that is fixed to the shaft 156.

The latches 150 are provided with detents 172 adapted to be moved up through slots 173 in rails 146 to stop the pallet 13 by its bottom edge and allow the pallet to lean over onto the upper retainer 149.

On the left hand side of the magazine and fixed to the shaft 151 is a rock arm 174 provided with a crank pin 175 arranged in the path of a rock arm 176 so that said pin 175 may rock the shaft 151 to withdraw the detents 172 from the guideways 146, thus allowing the pallet 13 to slip onto rockers 177 that are fixed to a rock shaft 178 supported by bearings 179. Said rockers 177 are provided with notches 180 to receive the lower edge of the upedged pallet 13, so that as the rockers rock forward, the lower edge of the pallet is carried forward and the pallet is caused to slide down the chutes. Figs. 7, 8 and 9 indicate successive positions of the pallet as the rocker rocks forward.

At the step, shown in Fig. 8, the pallet is tilted at an angle with its upper portion leaning against a retainer 181, and held by the projection 182 of the rocker 177 preparatory to sliding down a steep chute 183 leading from the magazine to seat the pallet on the holder 148.

The last step in the release of the pallet is shown in Figs. 6, 7, 8 and 9, where the rocker 177 appears in the positions it passes through to release the pallet, and while the pallet is sliding down the chute 183 to the pallet holder 148 that raises the pallet to the underside of the mold, where it is locked by a lock 204 shown in Fig. 6.

The pallet releasing arms 176 are fixed to the rock shaft 178 that is connected through a rock arm 184 of said shaft 178, a universal joint 185, a link 186, a second universal joint 187, a rock arm 188 of rock shaft 156, and a counter-weight arm 189 to a counter balance 190 that is adjustable on said arm and is held in adjusted position by the set screw 191.

The weight 190 through the mechanism previously described tends to swing the pallet seating members 170 out of clamping position to allow the pallet holder to be raised to the underside of the main body of the table, and locked thereagainst.

The pallet feeding, seating and releasing mechanisms are so timed that the advance pallet is released from the magazine shortly before the pallet holder carried around by and beneath the main body of the table swings into position to strike the tappet of rocker 155 that causes the members 170 to swing into pallet seating position in time to seat the pallet on the carrier; and the latches 150 swing into position holding the next pallet until the next mold and pallet holder are brought into position to receive a pallet. By this means a pallet is fed into the machine at each step of the table revolution.

The main driving shaft is provided with seven eccentric wheels and two face cam wheels.

The eccentric wheels and cams are best described by stating the functions they perform; as when such functions are set forth, a mechanic skilled in the art can make and mount the eccentrics.

The eccentric 192 is provided with a ring 193 that is connected to operate the pallet locking mechanism.

The eccentrics 194 and 195 are connected to operate the pallet holder raising and lowering mechanism simultaneously.

The cam wheel 196 is provided with the face cam 197 and is similar to the cam wheels 198 and 199, operating simultaneously to discharge the pallets and bricks from the machine onto the conveyor.

The eccentric 200 is provided with a collar 201, that is connected to operate the pallet unlocking mechanisms.

Eccentric wheel 202 is provided with a collar 203 that is connected to lift the brick expelling mechanism after it has expelled the bricks from the compartments of the mold.

Referring to Figs. 1, 2, and 12 to 16, each one of the molds 3, is provided with a lock 204 that is slidably mounted by lugs 205 that are fixed to each side of the molds as at 206.

The lock 204 comprises a bar 207 that extends across the front of the mold 3, slightly below the lower edge of the mold, and has rods 208 that fit into each end of the bar as at 209. The rods 208 slide through holes 210 of the lugs 205, and have tips 211 planed at an angle to fit under catches 212 that are fixed to the pallet holders 148 respectively as shown at 213.

Located between the bar 207 and its lugs 205 are nut 214 and sleeves 215 that allow adjustment of the locks respectively.

After the pallet 13 is placed upon the pallet holder, it is raised by cam 194 that is fixed to the driving shaft 96 as at 216 until the pallet rests against the bottom of the mold.

A vertical bar 217 has at its lower end a roller 218 that rolls around the periphery of an eccentric 194, and is provided at its top with a ball-bearing 219 that rests against the pallet holder 148.

Connecting bars 220 are fulcrumed at 221 to the vertical bars 217 and are fulcrumed at 222 to an extension 223 of the press 10 that keeps the bar 217 in a vertical position at all times, allowing the pallet holder to be raised at every revolution of the drive shaft 96.

As there are two of these vertical bars of similar construction, the other bar 224 operates on the eccentric wheel 195 and is located underneath the pallet holder as it is unlocked; allowing the pallet holder to lower to the required position where it is ready for the next step.

As the bars 217 and 224 operate simultaneously when they are raised, the pallet holder is carried by the bar 217 into position to be locked, and when the bars are lowered, the pallet holder is lowered by the bar 224 just after the pallet holder is unlocked.

The pallet holder 148 is provided with posts 225 that are held by set screws 226 to the pallet holder and that are slidably mounted in the table 1. The posts are provided at the top with washers and bolts 227 that keep the pallet holder from dropping out of the table.

228 are counterweights that balance the pallet holder and that are connected through a plate 229 to one of the posts 225 as shown in Fig. 33 of the drawings.

The mechanism for locking the pallets to their molds respectively, comprises oscillating arms 230 having extensions 231 and adapted to be oscillated by a shaft 232 to which the arms 230 are fixed and which shaft is supported by uprights 234' of the frame 234 and base 235 that is fixed by foundation bolts 236 to the foundation.

237 is an arm fixed to the shaft 232 by a set screw 237'. 237$^a$ is an arm journalled on the shaft 232 and operably connected with the arm 237 by a spring 237$^b$ on bolt 237$^c$ which is pivoted at 237$^d$ to said arm 237$^a$ that is pivotally connected by a ball stud 238 with an adjustable connecting rod 239, that is connected by a ball stud 240 with the eccentric ring 193, which is connected by the ball stud pivot 240' with a brace 241 which is pivoted to the gate supporting frame 242 by pivot 243, thus holding the eccentric ring 193 in place on the eccentric.

The main driving shaft 96 is supported by and revolves in the bearings 244, 244$^a$ and 245, the main bearing 246 on the centrally located bracket 247, the bearing 248 on the frame 234, and the bearing 249 on the frame 242.

The mechanism of this machine is so constructed and arranged that while the operation of both motors 14 and 15 are continuous, and the operation of the press operating shaft 19 is continuous. that the ram is only operated when a mold is in position to receive the ram; and the mechanism driven by the continuously running motor 15 is so constructed and arranged that the parts driven by the motor 15 operate in coordination with each other to perform the requisite movements at the several stations, each time the table comes to rest at each one sixth of the table revolution.

For the purpose of avoiding confusion in this description, I shall refer to the stations at which the molds are brought to rest as stations, A, B, C, D, E, and F, respectively.

The station A is the station at which the pallets are inserted and placed on the pallet holder, and at which the pallet holder is raised with pallet thereon, and locked against the under side of the mold; the station B is the station at which the composition is fed into the mold to which the pallet is locked by the pallet holder; the station C is the station at which the composition is compressed by the pressing ram; the station D is the rest station, at which no operation is performed and in which the pressed brick remains in the mold, preparatory to being lowered on the pallet; the next station, which is marked E in the drawing, is the pallet lowering station; and the last station F is the station at which he pallet with the molded bricks thereon is ejected from the machine.

The pallet having been inserted and locked at station A, the table is turned one-sixth turn and comes to rest with the mold in place at station B ready to receive a charge of composition from the chute 6.

The mechanism for opening and closing the hopper gate 267 is then put into action. Such mechanism comprises a bevel gear 250 that is fixed to the driving shaft 96, and meshes with a bevel gear 251 that is fixed to a flexible shaft comprising sections 252, 255 connected by universal joint 256. The section 252 is supported by and revolves in the bearings 253 and 254 that are bolted to the frame 242; the section 255 is supported by and revolves in the bearings 257 and 258 that are bolted to the frame 242.

The gate opening and closing mechanism of the hopper 7 comprises a crank 259 on the end of the flexible shaft, and connected through a pivot 260, connecting bar 261, and pivot 262, to the lower end of the gate operating lever 263 which is fulcrumed at 264 to the frame 242, and has a lost motion fork 265 for engagement with the bar 266 of the hopper gate 267 to open and close said gate. When the lever 263 is oscillated by the mechanism previously described, it opens and closes the gate 267 and allows a charge of the composition to be delivered to the mold.

The arrangement of crank, connecting rod and lever with lost motion device shown causes the constant revolution of the crank to operate the gate with periods of rest between the moments of operation so that when the gate is open as indicated in broken lines in Fig. 17, it remains open long enough to allow a charge of composition to fill the mold, and when the gate is closed as shown in solid lines in Fig. 17, it remains closed while the table rotates to move the filled mold from station B to station C.

The gate 267 comprises a plate 268 that covers the top of the mold, and slides in a guideway 269 of the hopper 7, and has lugs 270 that rest against a bar 271 to keep the gate from sliding out of the hopper, when the gate is open.

Fixed to the plate 268 are guide bars 272 that are slidably mounted by an upright extension 273 of the frame 242, and that hold the gate in alignment with the guideways of the hopper.

A shock absorber 274 is provided to minimize the jar of the table, at the close of each step from station to station so that the table will come to a stop at each station without severe shock.

To effect this operation each mold is provided with a bolt 275 that engages a disc 276 on a rod 277 having a spring 278 that takes up the shock, and after the mold is swung into another position, returns the disc 276 to its original position allowing the next mold to engage it.

The machine is so timed in its operation that one revolution of the flexible shaft occurs in about two seconds and the composition 8 is of a loose character and the internal cross section of the chute 6 is equal to the area of the mold, and the arrangement of the pivot 262, the oscillating lever 263, the fulcrum 264 and the width of the open space between the forks at 265 is predetermined by the constructor to allow the requisite amount of composition to flow into the mold during the time the gate is open. In order to level the charge as the mold moves from below the closed gate, a leveling strip 298' is hinged to the onward side of the chute and stands aslant at a suitable angle under depression of a spring 298$^a$ to level the charge as the mold moves from station B so that the compartments of the mold will be uniformly filled.

At station C as indicated in Fig. 17, the filled mold comes to rest as the charges in the compartments thereof are compressed as hereinbefore suggested.

At the next step the mold containing the pallet and the pressed bodies or green bricks is moved to station D and is then held stationary without being subjected to any operation, while the operations just described are being effected at stations A, B, and C, respectively.

At the next step the mold and pallet and the green bricks thereon are moved to, and come to rest at station E where the pallet is unlocked and lowered from the mold with the green bricks thereon.

The mechanisms provided for unlocking the pallet and for lowering it and the green bricks thereon, from the mold, will now be described.

At station E there are provided two bolt retracting arms 279 adapted to engage the bar 207 to withdraw the bolts 208 from the catches 212; said arms are fixed to a rock shaft 280 journalled in a frame 281 having uprights 282 supported by a base 283 bolted to the foundation by bolts 284. Each of said rock arms 279 is formed of two members, one of said members 288 being fixed on the rock shaft 280 and the other member 285 being in the nature of a dog pivoted at a joint 286 to the member 288.

The joint 286 is provided with a spring 287 that normally holds the dog 285 in bar engaging position and allows the lock frame 204 to pass the dogs as the mold passes to rest position at station E.

As the mold is moved into position at station E to allow the pallet holder to be unlocked and lowered the dogs are passed by the lock frame and the springs 287 bring the dogs to position back of the lock bar 207 ready to act on said bar to withdraw the bolt to unlock the pallet holder from the mold as illustrated in Fig. 24.

The arms 279 are connected through the crank 289 of shaft 280, by a ball stud 290, and thence by an adjustable rod 291, and a ball stud 292 to the eccentric collar 201. The parts are so constructed and arranged that the lock bar 207 is forced outward thus unlocking the pallet holder immediately when the mold comes to rest at station E.

The eccentric ring 201 is steadied by a brace 293 pivoted at 294 to one of the uprights 282 and pivoted to the ring by the ball stud 292.

The heads 295 of the expelling rams 11 are fixed to ram rods 296 that are slidably mounted in the bearings 297, that are fixed to the bracket 100 of the stationary frame, and are held from rotating, by splines 298 so as to register with the compartments respectively of the mold 3 when the mold comes to rest therebeneath.

As the mold is moved into position at station E to allow the pallet holder to be unlocked and lowered, and the green bricks to be pressed out of the mold, the dogs 285 are passed by the lock frame and the springs 287 bring the dogs to position back of the lock bar 207 ready to act on said bar to withdraw the bolts 208 to unlock the pallet holder from the mold as illustrated in Fig. 24, when the rock shaft 280 is rocked by the eccentric ring 201.

The arms 279 are connected through a crank 289 of shaft 280 by a ball stud 290, and thence by an adjustable rod 291 and a ball stud 292, to the eccentric ring 201 operated by eccentric wheel 200 fixed to the intermittently revolved driving shaft 96 which makes one revolution at each rest period of the table, while the rams and other mechanisms are operating.

The parts are so connected and arranged that the dogs 285 force the lock bar 207 outward, thus withdrawing the bolts from catch 12 and unlocking the pallet holder, immediately the mold comes to rest at station E.

It is necessary that liability of crushing or shattering the green bricks shall be guarded against, and with this in view the expelling mechanism comprises loosely connected and gravity operated expelling rams 11.

Referring to Figs. 27–31 the brick expelling rams 11 that expel the molded bodies 12 from the compartments 30 of the mold, are adapted to move down by gravity into the compartments of the mold at the time the pallet is unlocked from the mold.

A yoke 299 is connected to a suspension bar 300 through which the upper ends of the rods 296 extend, and to which they are suspended by heads 301 on the upper ends of the rods; said rods 296 have limited vertical motion through the bar 300 by reason of the collars 302 fixed to the rods and spaced below the bar 300. The yoke is connected by a ball and socket joint 303 to a vertical rack 304 held by guides 305 in mesh with a pinion 306 that is fixed to a rock sleeve 308 which is journalled on the shaft 90 and is provided with a rock arm 314 provided with a wrist pin 315 on which is journalled a link 313 having a vertical slot 312 in which a pin 311 on a lever 309 operates. Said lever is fulcrumed on a stationary pivot 317 and is connected by pivot 310 with the eccentric ring 203 of the eccentric 202 which revolves in the direction of the arrow in Fig. 29 to pull down the free end of the lever 309, to lift the rack 304 and hold it suspended above the level of the molds when the molds move from station to station.

The weight of the rack 304, yoke 299, rods 296, and expelling rams 295 is sufficient to lift the link 313 when the eccentric ring 203 does not hold the operative end of the lever down; but when said eccentric ring is in the lowered position shown in Fig. 29, the lever 309 draws the crank arm 314 down, thus raising the rack 304 to the dotted position in Fig. 29, and the solid position in Fig. 30.

The eccentric 202 is so timed with the movement of the table, that it holds the free end of the lever 309 depressed, and the rack and the expelling rams raised, while the table is moving; and vice versa.

When the rams have expelled the green bricks from the molds they cease their downward movement, but the pallet holder and pallet continue to move down until they reach the clearance position shown in Fig. 31, when they are free to be revolved by the table to the discharging station F, as shown.

Such revolution then takes place as hereinbefore described.

Referring to Figs. 32–34, the pallet and brick discharging mechanism comprises oscillating arms 318 that are fulcrumed on a shaft 319 as at 320 for oscillation first in one direction and then in another, in planes that are at right angles to each other so that they may be swung away from the table to allow a pallet and the green bricks thereon to pass to alinement with the conveyor and spread apart to escape the green bricks 12 and the pallet, and then toward each other to bring the fingers in behind the pallet, and then out to eject the pallet onto the conveyor G.

The shaft 319 is supported in a bearing 321 and has collars 322 to prevent it from sliding out of the bearing.

The oscillating arms are provided at their tops with fingers 323 pivoted at 324 to allow their ends 325 to glide along the upper surface of the pallet holder directly back of the pallet to slide the pallet with the green bricks thereon, to the conveyor G, the pallet holder through the cams 196 and 198, that cause the arms 318 to oscillate through rollers 326, that are fulcrumed at 327 to an extension 328 that is fixed to the oscillating arms 318.

The rollers 326 ride on the periphery of the cams 196 and 198 and are normally held against the cams by the springs 329.

The oscillating arms 318, after moving the bricks and pallet onto the conveyor, are spread slightly outward from the pivot 320 and remain in this position while they return inwardly to their position back of the next pallet with a load of bricks that has been swung into position to be delivered to the conveyor.

To spread the oscillating arms 318 outward, the bars 330 that are pivoted at 331 to the bracket 332, that is fixed to the press 10, are provided with rollers 333, that are held against the faces of the cams by a rod 334, that is slidably mounted in the bars 330, having springs 335 that are adjusted by the nuts 336. The oscillating arms are normally held against the bars 330 by a spring 337.

The faces of the cams 197 and 199 have depressions 338 consisting of an arc of approximately 120° that the rollers 333 roll in and acting through the springs 335 spread the oscillating arms 318 outwardly.

339 indicates a bar on which the oscillating bars 330 slide when they are swung slightly outward.

The rotary table 1 has a hub 340 with ribs 341 and has ball races 342 that are placed and constructed is shown in Fig. 33 to allow the table to revolve on the upright axis 2 that is supported at the top by the bracket 343 underneath and close to the table, and is supported at the bottom by the bracket 247 and is kept from turning by the set screws 344.

In operation, the pallets are supplied to the magazine located at the station A in bunches inserted manually or mechanically at the front of the machine at an angle of about 60° more or less; the advance pallet 13 leaning forward aslant, is released by the latches 150 of the pallet feeding mechanism, and the lower edge of the pallet is allowed to slide onto the rockers 177 of the feeding mechanism, which lowers the pallet slightly, with the upper portion thereof leaning against the first retainer 149, said rocker then moves the pallet lower and tilts it at an angle to the upper portion and causes the pallet to lean against the second retainer 181, and then draws the lower edge of the pallet forward into the chute and releases the pallet from the second retainer, and allows the pallet to slide down the chute 183 of the magazine onto the pallet holder 148, where it is clamped by clamp 171 as shown in Figs. 6 and 10.

At station A, a weight operates the mechanism to release the pallet seating means 171 just before the pallet and pallet holder are raised to the underside of the mold, and then the pallet holder is locked by the lock 208, and is moved to station B by the next step in the rotation of the table.

The table is held stationary at each station by the locking pin 40.

At station B, the gate opening and closing mechanism shown in Fig. 17 operates the gate 268 for delivery of a charge of aggregate from the hopper, to the mold.

At station C the material is pressed in the compartments of the mold by the plungers 28, to the predetermined density, and at station D the pressed bodies are held stationary.

At station E the unlocking mechanism unlocks the pallet holder from the mold, and the expelling rams 11 expel the pressed bodies or green bricks from the compartments of the molds as the pallet holder is lowered by the pallet holder 148 operated by its lowering mechanism.

At station F, the pallet and bricks are discharged by the discharging mechanism from the machine onto the conveyor and are carried away for drying and curing.

We claim:

1. The combination with a die press and a motor for operating the same, of a table; means operable by the motor, to revolve the table step by step; molds carried by the table and corresponding in number to the number of steps in one revolution of the table; pallets for the molds; means for supplying the molds with pallets at one station at each step of the table; means for supplying the mold at another station with material to be pressed: means for pressing the contents of the mold at another station; means for expelling from the mold at another station, the pressed contents of the mold; means to lower the pallet as said contents are expelled from the mold; means for discharging the pallet and the pressed bodies at another station; means for holding the table stationary between stops; and means for simultaneously operating the pallet applying, the charge supplying, the material pressing, the body expelling, the pallet lowering, and the pallet and pressed body discharging means, each time the table is held stationary.

2. The combination with a die press and a motor for operating the same, of a table; means operable by the motor, to revolve the table step by step; molds carried by the table and corresponding in number to the number of steps in one revolution of the table; pallets for the molds; means for supplying the molds with pallets at one station at each step of the table; means for supplying the mold at another station with material to be pressed; means for pressing the contents of the mold at another station; means for expelling from the mold at another station, the pressed contents of the mold; means to lower the pallet as said contents are expelled from the mold; means for discharging the pallet and the pressed bodies at another station; and means for simultaneously operating the pallet applying, the charge supplying, the material pressing, the body expelling, the pallet lowering, and the pallet and pressed body discharging means, each time the table is held stationary.

3. An automatic brick making machine having a mold, and a pallet holder below the mold; of a magazine adapted to hold a bunch of pallets; means to hold the advance pallet aslant over-hanging toward the mold and pallet holder, means to move said pallet edgewise onto the pallet holder below the mold, and means to move such advance pallet from the aslant position to said last mentioned means.

4. In a brick machine having a mold, a pallet holder below the mold and mechanism to clamp a pallet on the pallet holder; a magazine having a downwardly sloping surface to support the lower edges of the pallets; a detent to stop the lower edge of the advance pallets; a retainer for the upper edge of the advance pallet; a rocker to receive the lower edge of the advance pallet and move it toward the pallet holder; means to move the pallet onto the pallet holder; and means to move the pallet holder to clamp the pallet onto the mold.

5. In a brick making machine having a pallet holder and mechanism to place a pallet on the holder; a magazine having a downwardly sloping surface to support the lower edges of a bunch of pallets stood on edge; a stop for the lower edge of the advance pallet; retainers for the upper edge of the advance pallet; one retainer being in advance of and at a lower level than the other; means to move the advance pallet edgewise to release its upper edge from the retainers successively to allow said advance pallet to move edgewise toward the pallet holder, and a slide down which the pallet may slide to the pallet holder.

6. In a brick making machine comprising a downwardly aslope surface to support a bunch of pallets on edge, retainers for the top of the advance pallet of such bunch, a latch to hold the advance pallet until it is moved down to release the top edge from the retainers; and means to move the advance pallet from the retainers and deliver it to the pallet holder.

7. In a brick making machine having molds and a pallet holder for the molds respectively; means to place the pallets on the holders respectively; mechanism to raise the pallet holders and the pallets against the mold; means to clamp the pallet holders and the pallets against the mold and means to subsequently release the clamping means.

8. In an automatic brick making machine having molds open at top and bottom; a pallet holder; means to place a pallet on the pallet holder; means operable by a cam to raise the pallet holder and the pallet against the bottom of the mold and means to clamp the pallet holder and pallet against the molds.

9. In a brick making machine, a table; molds open at top and bottom and carried by the table; pallet holders for the molds respectively; pallets to close the bottoms of the molds, and locking mechanism to lock the pallet and holders to the molds respectively.

10. In an automatic brick making machine; a table; molds open at top and bottom and carried by the table; pallets to close the bottoms of the molds respectively; pallet holders for the molds respectively; pallet holder raising and locking mechanisms; a main drive shaft; cam wheels on said shaft to operate such mechanisms; a motor; and a jack shaft through which power is transmitted from the motor to the table driving shaft which transmits power to the main driving shaft.

11. In an automatic brick making machine provided with a revolving table; molds carried by the table; pallets for the molds respectively; means for revolving the table intermittently step by step; a pallet holder; and means to lock and unlock the pallet and pallet holder to and from the mold at a stationary position of the table.

12. In a brick making machine having a table and molds carried by the table; pallet holders for the molds respectively; pallet holder; carried by the molds; means to revolve the table and means operable by such means to lock the pallet holder and unlock it from the mold.

13. In an automatic brick making machine having molds; means for moving the molds from station to station; means at one station for completing the pressing of the contents of the molds; a ram for expelling pressed contents of the molds at another station; and means operable by the mold moving means to operate the expelling ram.

14. In a brick making machine having molds; means to move the molds step by step; a cam shaft; cam wheels on the shaft; a pallet holder; means operable by one of the cam wheels to raise the pallet holder; means operable by another of the cam wheels to lock the pallet holder to the mold; means operable by another cam wheel to unlock the pallet holder from the mold; and means operable by another of the cam wheels to lower the pallet holder from the mold.

15. In an automatic brick making machine having a rotary mold carrying table; means to revolve the table step by step; mechanism to slow down the table at the end of every step to relieve the shock; and means to hold the table stationary between steps.

16. In an automatic brick making machine, a magazine for holding a bunch of pallets; a mold, a pallet holder for the mold; means to take pallets singly and successively from the magazine and deliver them to the pallet holder; means to raise and lock the pallet holder to the mold; means to supply the mold with aggregate; means to revolve the table intermittently step by step; means to press the material in the mold; means to unlock the pallet holder from the mold; means to lower the pallet holder from the mold; and means to expel the pallet and molded brick from the mold as the pallet holder is lowered.

17. In a brick making machine having a mold, a pallet holder and means for supplying a pallet to the pallet holder; means to raise the pallet holder to hold a pallet on the mold; means to lock the pallet holder to the mold; means to supply to the mold material to be pressed; means to press the material in the mold; means to unlock the pallet holder from the mold; a ram to expel the pressed body from the mold; means to lower the pallet holder; means to raise the expelling ram; means to move the mold pallet holder and pallet to a discharging station; means to discharge a pallet and pressed brick from the machine.

18. In an automatic brick making machine having a table; molds carried by the table; a table driving shaft; means operable by the shaft to revolve the table step by step; mechanism to hold the table stationary between steps; a main driving shaft; a pressing ram; a clutch on said main driving shaft to connect and disconnect the table holding mechanism with the table; and means operable by said shaft to cause the pressing ram to operate when the table is stationary.

19. In an automatic brick making machine a mold carrying table having sockets; mechanism for closing and opening the sockets; a locking pin to enter the open sockets, respectively; and means for intercepting the locking pin at the sockets, respectively.

20. In a brick making machine having a frame; a mold carrying table; means to revolve the table; table holding mechanism having levers; an extension from the frame on which the levers of the table holding mechanism fulcrum; and means operable by a clutch to connect and disconnect the table with the mechanism for holding the table; and a disk to shift the clutch.

In testimony whereof, we have hereunto set out hands at Los Angeles, California, this 30th day of December, 1925.

MURRAY S. ELTON.
GEORGE EDWARD BARNHART.